US012605575B2

(12) United States Patent
Moran et al.

(10) Patent No.: US 12,605,575 B2
(45) Date of Patent: Apr. 21, 2026

(54) TESTING APPARATUS FOR RESPIRATORS AND METHOD OF USING THE SAME

(71) Applicant: ATOR LABS, INC., Panama City Beach, FL (US)

(72) Inventors: Robert Nickell Moran, Panama City Beach, FL (US); Francisco Elias Hernandez, Panama City Beach, FL (US); David E. Cowgill, Panama City Beach, FL (US)

(73) Assignee: ATOR LABS, INC., Panama City Beach, FL (US)

( * ) Notice: Subject to any disclaimer, the term of this patent is extended or adjusted under 35 U.S.C. 154(b) by 407 days.

(21) Appl. No.: 18/315,284

(22) Filed: May 10, 2023

(65) Prior Publication Data

US 2023/0364451 A1 Nov. 16, 2023

Related U.S. Application Data

(60) Provisional application No. 63/340,403, filed on May 10, 2022.

(51) Int. Cl.
*A62B 27/00* (2006.01)
*A62B 18/10* (2006.01)
*A62B 9/02* (2006.01)

(52) U.S. Cl.
CPC .............. *A62B 27/00* (2013.01); *A62B 18/10* (2013.01); *A62B 9/022* (2013.01)

(58) Field of Classification Search
CPC ...................................................... A62B 27/00
See application file for complete search history.

(56) References Cited

U.S. PATENT DOCUMENTS 4,466,251 A * 8/1984 Chellis .................... F01L 25/06 137/340
4,796,467 A * 1/1989 Burt ...................... G01M 3/027 128/200.24
2009/0139348 A1* 6/2009 Speldrich ............. G01F 1/6842 73/861.66
2015/0040910 A1* 2/2015 Koehler ............... A62B 18/082 128/205.27

FOREIGN PATENT DOCUMENTS

DE 19627388 A1 * 1/1998 ............. A62B 27/00
GB 2032284 * 5/1980
WO WO-2012139023 A2 * 10/2012 ......... B01D 53/0454

* cited by examiner

*Primary Examiner* — John E Breene
*Assistant Examiner* — Alex T Devito
(74) *Attorney, Agent, or Firm* — Shumaker, Loop & Kendrick, LLP; Patrick B. Horne

(57) ABSTRACT

A testing apparatus for respirators and a method of using the same. The testing apparatus comprises a piston assembly including a piston movably disposed in a chamber and a motor assembly including a motor operably connected to the piston. The motor configured to move the piston in an exhalation direction producing a simulated exhalation and in an opposite inhalation direction producing a simulated inhalation. An amount of gas in the chamber increases during the simulated inhalation and decreases during the simulated exhalation. The method of using the test apparatus comprises the steps of causing the simulated inhalation and the simulated exhalation to determine whether the respirator meets at least one predefined requirement.

11 Claims, 16 Drawing Sheets

SECTION C-C

SECTION E-E

SECTION F-F

SECTION G-G

TESTING APPARATUS FOR RESPIRATORS AND METHOD OF USING THE SAME

CROSS-REFERENCE TO RELATED APPLICATION

This application claims the benefit of and priority to U.S. Provisional Patent Application Ser. No. 63/340,403, filed May 10, 2022, the entire disclosure of which is hereby incorporated herein by reference.

FIELD

This application relates generally to the field of respirators, and more particularly to a testing apparatus for respirators.

BACKGROUND

Conventional respirators fall into two basic classes depending upon the manner in which breathing air is supplied. In the first class of respirators, the breathing air is ambient air which flows through a filter (e.g. an air-purifying respirator (APR) and a powered air-purifying respirator (PAPR)). The second class of respirators is a compressed air breathing apparatus, which supplies the breathing air from a compressed air source through a demand system (e.g. a self-contained breathing apparatus (SCBA)).

Various types and special types of APRs and PAPRs are known such as chemical, biological, radiological, and nuclear (CBRN) respirators. However, each of the APRs and PAPRs typically include a facepiece that covers a nose and mouth of a wearer. For APRs, the facepiece may be constructed with three apertures—two on opposite sides and one in a lower center area. The two apertures on opposite sides are designed for inhalation and provide a path for air pulled into the facepiece by a negative pressure created interiorly by the wearer inhaling. Each of the inhalation apertures may include an inhalation filter cartridge to remove contaminants from the air being drawn into the facepiece. In the lower center portion of the facepiece is an exhalation valve, which opens when the wearer exhales (i.e., when there is an over-pressure interiorly to the facepiece relative to the environment), and which closes when the wearer inhales (i.e., there is a negative pressure interiorly to the facepiece relative to the environment). In addition, it is common also to place oppositely operating but similar type valves in the inhalation filter cartridges.

Like the APRs and PAPRs, the SCBA utilizes a facepiece, but also includes the demand oxygen system having the compressed air cylinder. Typically, the SCBA is used in such environments that do not support normal breathing. It is in an environment where oxygen percentage is below 19.5%, presence of toxic and/or poisonous fumes, gases, and smokes that are an imminent danger to life and health. SCBAs fall into two general categories: closed-circuit (CC) and open-circuit (OC). CC-SCBAs recirculate and recycle exhaled air and are sometimes referred to as rebreathers. On the other hand, OC-SCBAs provide compressed air for inhalation and exhaust exhaled air to the atmosphere. One type of OC-SCBA is a positive-pressure, open-circuit SCBA where, upon a reduction in pressure inside the facepiece, the SCBA activates an airflow from the compressed air source through the demand system to inside the facepiece. However, the pressure inside the facepiece is always more than the atmospheric pressure to ensure that no outside air can enter into the facepiece.

Respirators serve an important function by protecting wearers from significant hazards including insufficient oxygen, harmful pollutants and contaminants, as well as airborne pathogens, and thus, the performance and effectiveness of the respirators are critical. Accordingly, it would be desirable to produce a testing apparatus for respirators that determines whether respirators perform satisfactorily according to certain processes and procedures.

SUMMARY

In concordance and agreement with the presently described subject matter, a testing apparatus for respirators that determines whether respirators perform satisfactorily according to certain processes and procedures, has been newly designed.

Embodiments of the presently described subject matter address the above needs and/or achieve other advantages provided herein.

In one embodiment, a testing apparatus for a respirator, comprises: a piston assembly configured to produce a simulated exhalation and a simulated inhalation; and at least one sensor configured to detect at least one parameter during at least one of the simulated inhalation and the simulated exhalation, wherein the testing apparatus determines whether the respirator meets at least one predefined requirement based upon the at least one parameter.

As aspects of some embodiments, the at least one sensor is a pressure sensor.

As aspects of some embodiments, the at least one sensor is an optical sensor.

As aspects of some embodiments, the at least one sensor is an optical sensor configured to monitor at least one component of the respirator.

As aspects of some embodiments, the testing apparatus further comprises a receiving portion configured to receive a facepiece of the respirator.

As aspects of some embodiments, the at least one parameter is at least one of a pressure within the facepiece of the respirator.

As aspects of some embodiments, the receiving portion includes a passageway formed therein to permit a gas flow therethrough.

As aspects of some embodiments, the at least one sensor is a pitot sensor disposed in the passageway of the receiving portion of the testing apparatus.

As aspects of some embodiments, the at least one parameter is a flow velocity within the passageway.

As aspects of some embodiments, the at least one parameter is a pressure within the passageway.

As aspects of some embodiments, at least a part of the piston assembly is formed from an additive process.

As aspects of some embodiments, an upper surface of the piston assembly includes at least one surface irregularity to minimize an impact of pressure waves on the piston assembly.

As aspects of some embodiments, the piston assembly includes at least one sealing element to form a substantially fluid-tight seal between a piston and an inner surface of the piston assembly that defines a chamber therein.

As aspects of some embodiments, the testing apparatus further comprises a controller in communication with the at least one sensor.

As aspects of some embodiments, the at least one predefined requirement is set by at least one of Occupational Safety and Health Administration (OHSA), National Institute for Occupational Safety and Health (NIOSH), and National Fire Protection Association (NFPA).

In another embodiment, a method for testing a respirator, the method comprises: providing a testing apparatus configured to produce a simulated inhalation and a simulated exhalation, the testing apparatus including at least one sensor configured to detect at least one parameter; causing, via the testing apparatus, at least one testing method to be conducted; detecting, via the at least one sensor, at least one parameter during the at least one testing method; and determining, via the testing apparatus, whether the respirator meets at least one predefined requirement based upon the at least parameter.

As aspects of some embodiments, at least one of an initial second stage cracking effort and a facepiece exhalation valve opening pressure is measured by the testing apparatus.

As aspects of some embodiments, the at least one testing method includes at least one of a maximum facepiece pressure during breathing resistance test conducted at a first predetermined level, a minimum facepiece pressure during breathing resistance test conducted at a second predetermined level, a facepiece pressure during breathing resistance test conducted at a third predetermined level, a first stage pressure during breath resistance test conducted at a fourth predetermined level, and a first stage pressure during breath resistance test conducted at a fifth predetermined level.

As aspects of some embodiments, the at least one testing method includes at least one of a static testing and a bypass valve testing to measure at least one of a facepiece static pressure, a first stage regulator static pressure, and a bypass valve flow.

In yet another embodiment, a method for testing a respirator, the method comprises: providing a testing apparatus configured to produce a simulated inhalation and a simulated exhalation, the testing apparatus including at least one sensor configured to detect at least one parameter; causing, via the testing apparatus, the simulated inhalation and the simulated exhalation; detecting, via the at least one sensor, at least one parameter during the at least one of the simulated inhalation and the simulated exhalation; and determining, via the testing apparatus, whether the respirator meets at least one predefined requirement based upon the at least parameter.

The features, functions, and advantages that have been discussed may be achieved independently in various embodiments of the presently described subject matter may be combined in yet other embodiments, further details of which can be seen with reference to the following description and drawings.

BRIEF DESCRIPTION OF THE SEVERAL VIEWS OF THE DRAWINGS

Figure 1A:
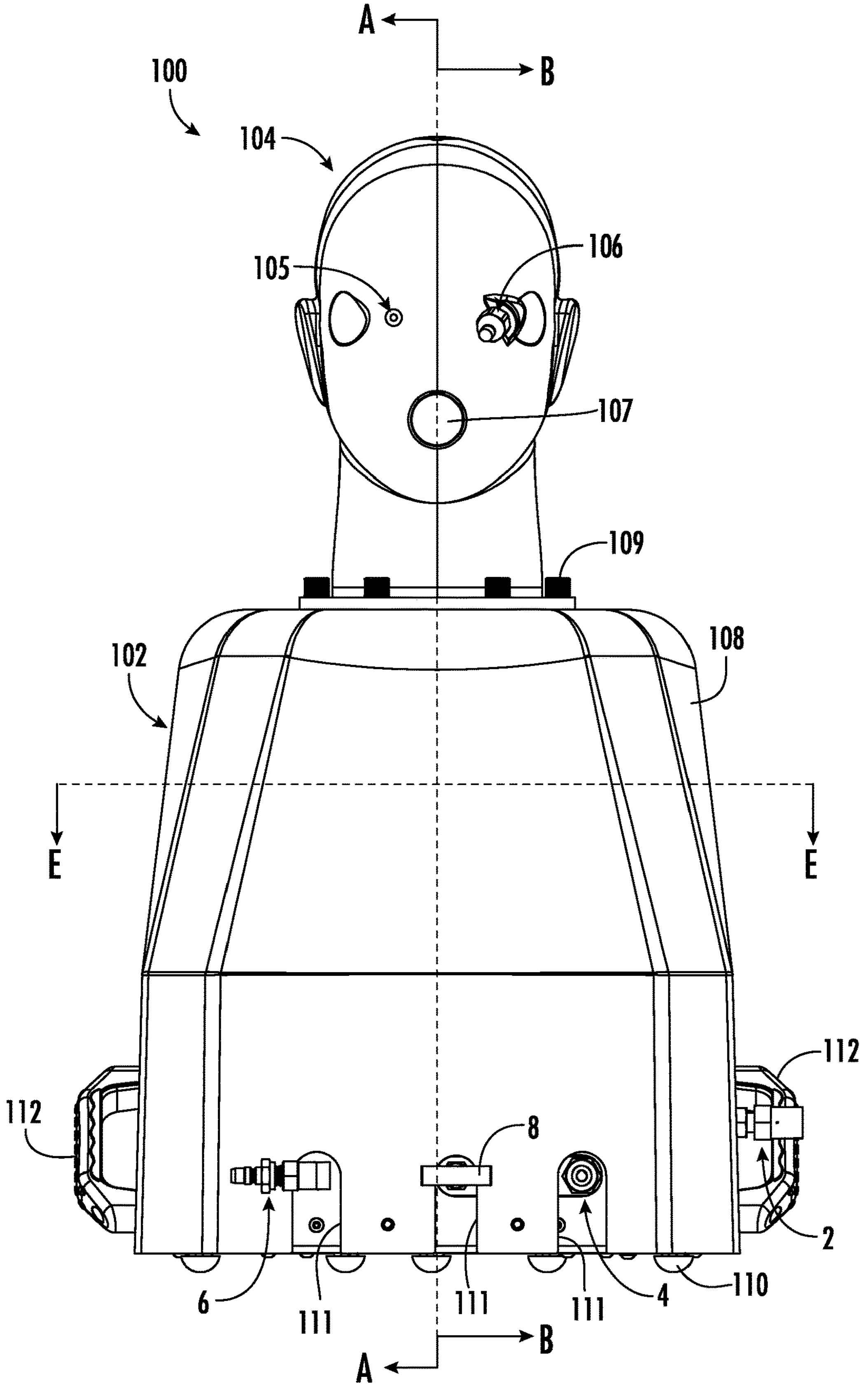
Figure 1B:
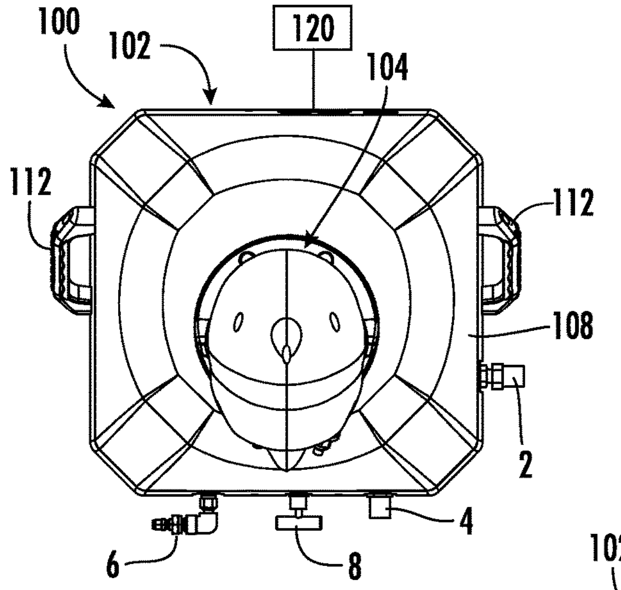
Figure 1C:
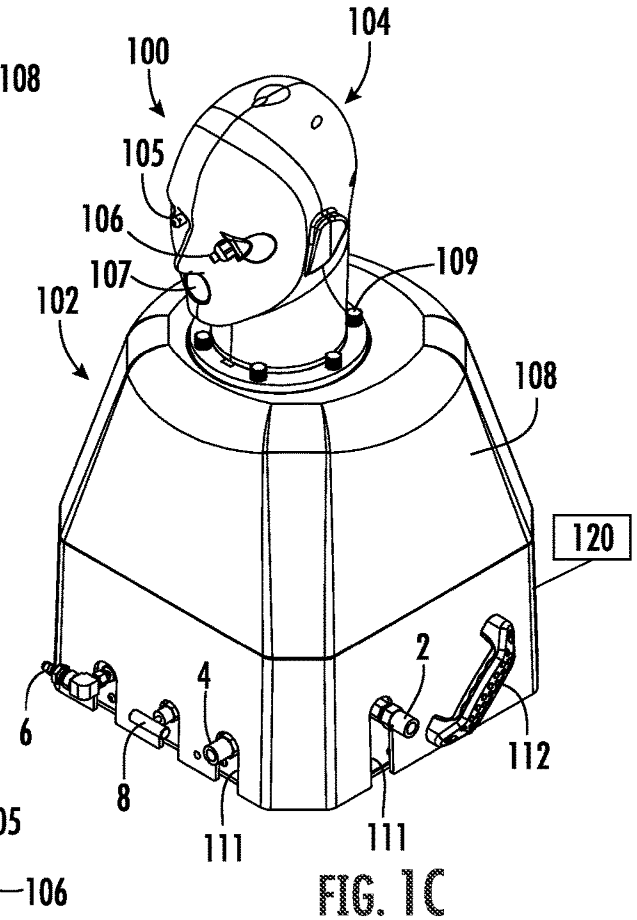
Figure 1D:
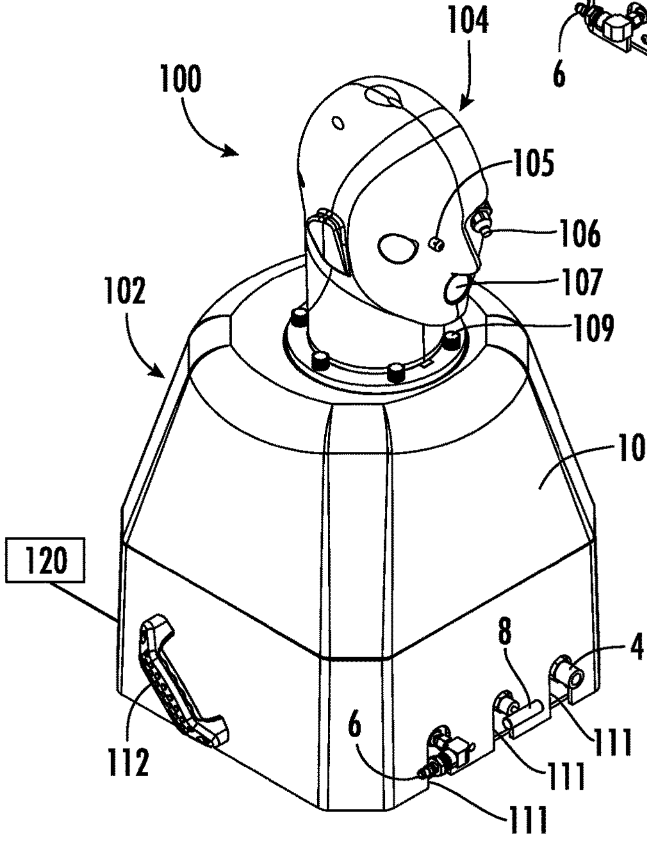
Figure 1E:
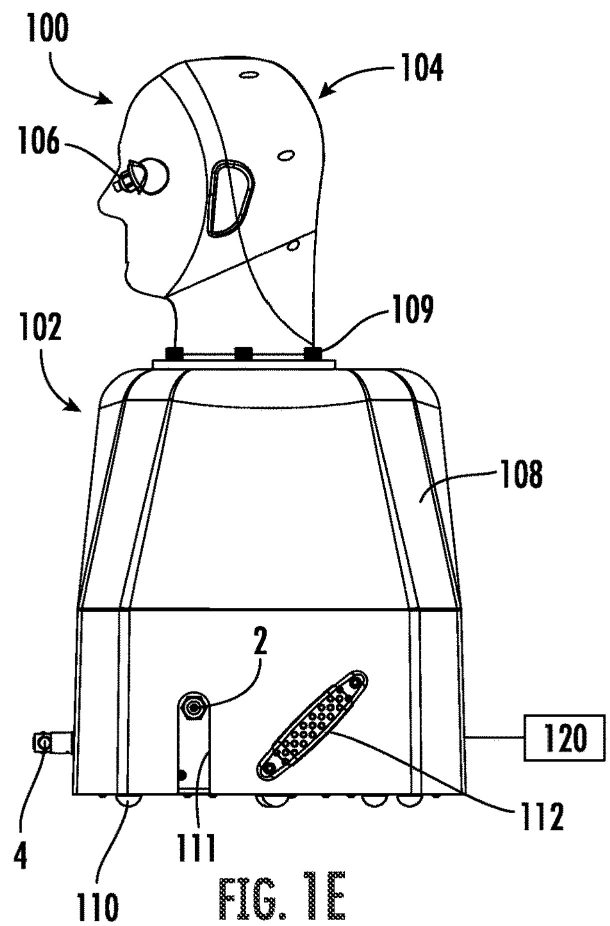
Figure 1F:
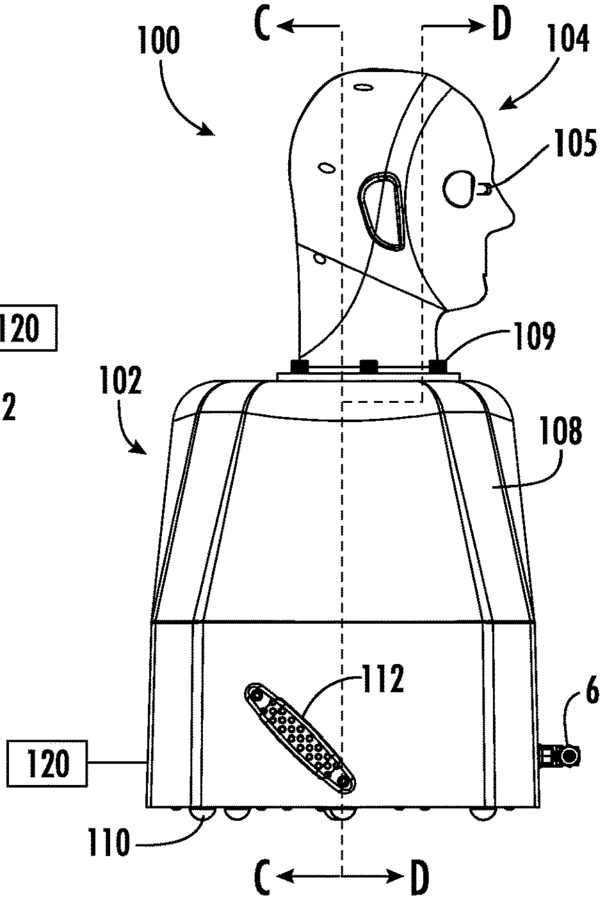
Figure 1G:
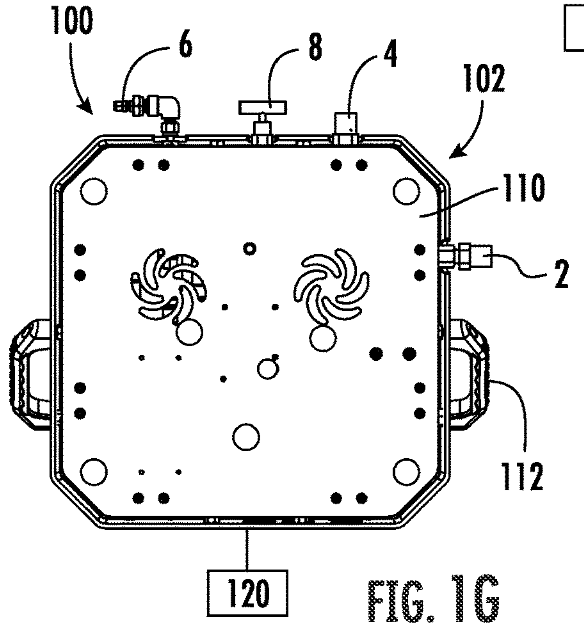
Figure 2A:
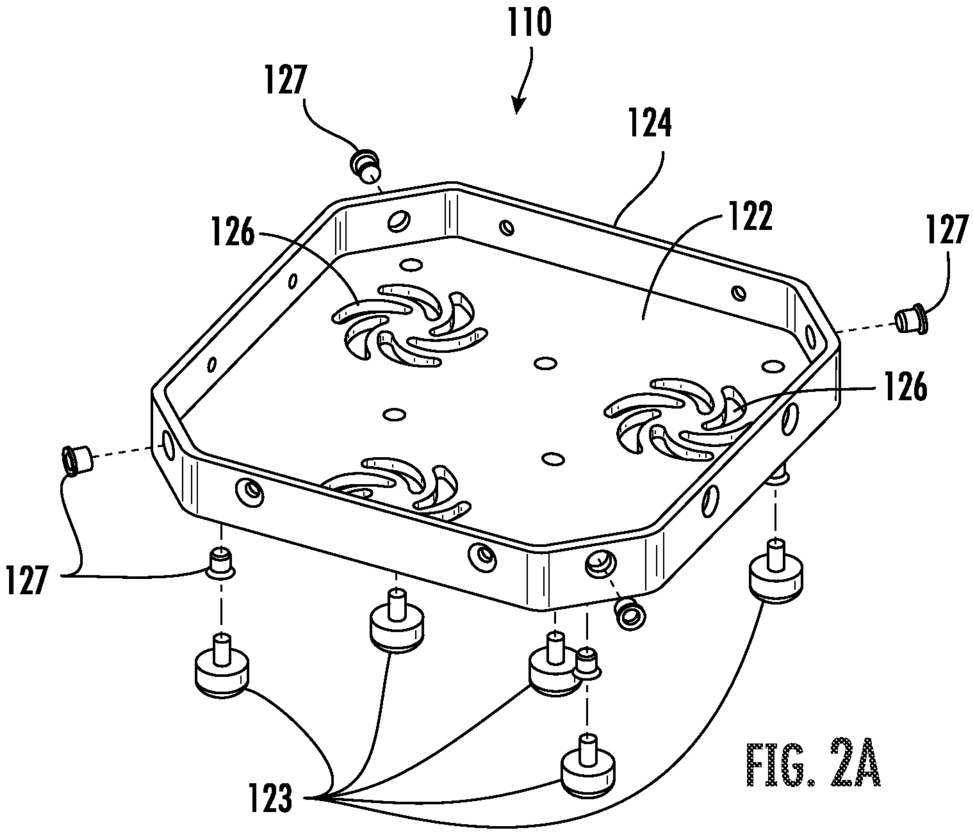
Figure 2B:
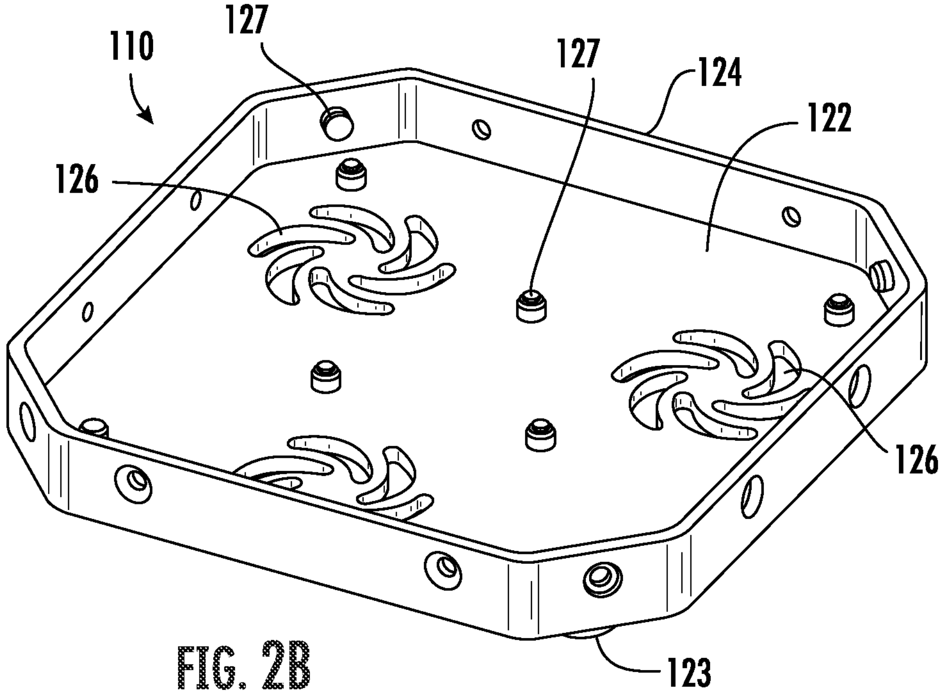
Figure 3:
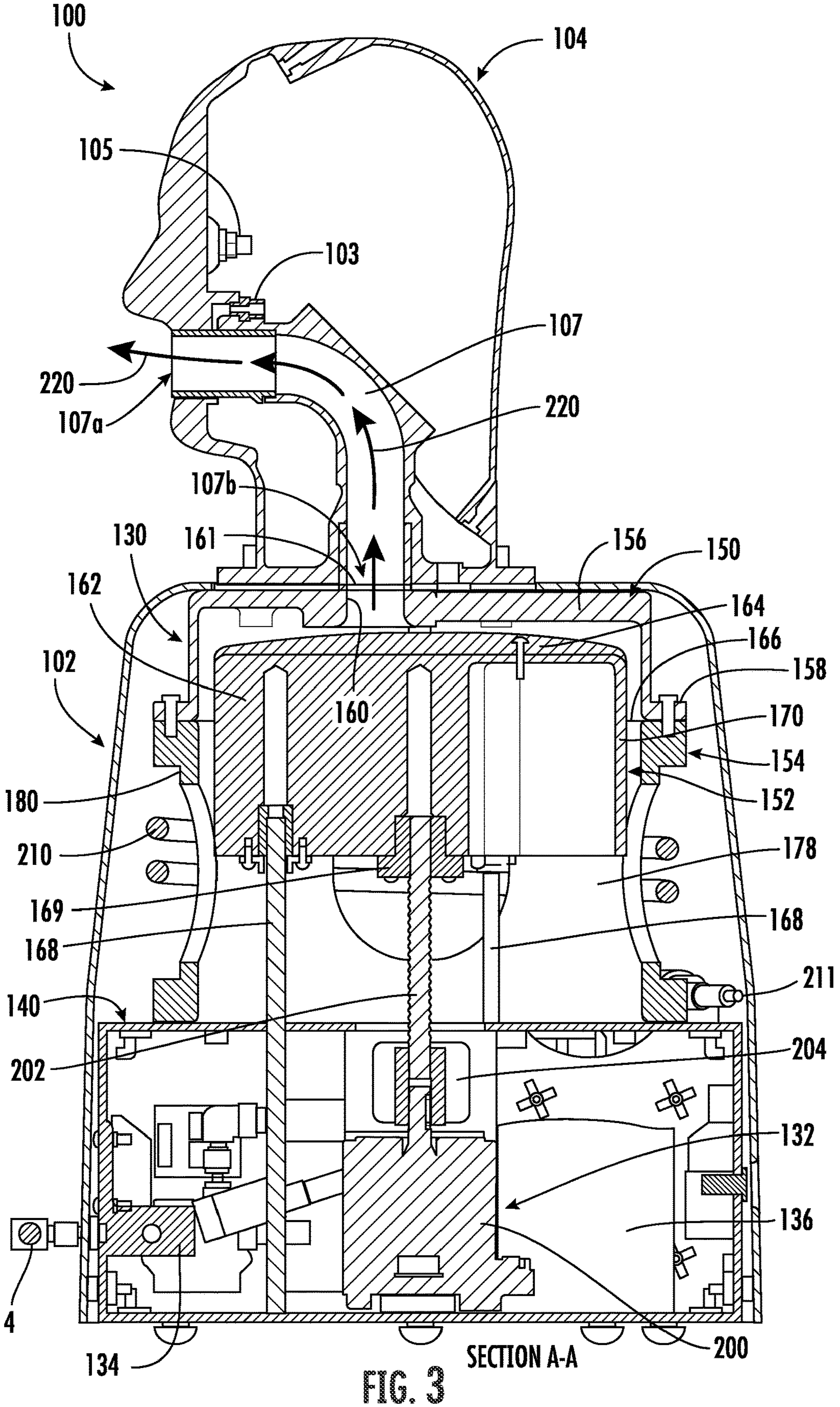
Figure 4:
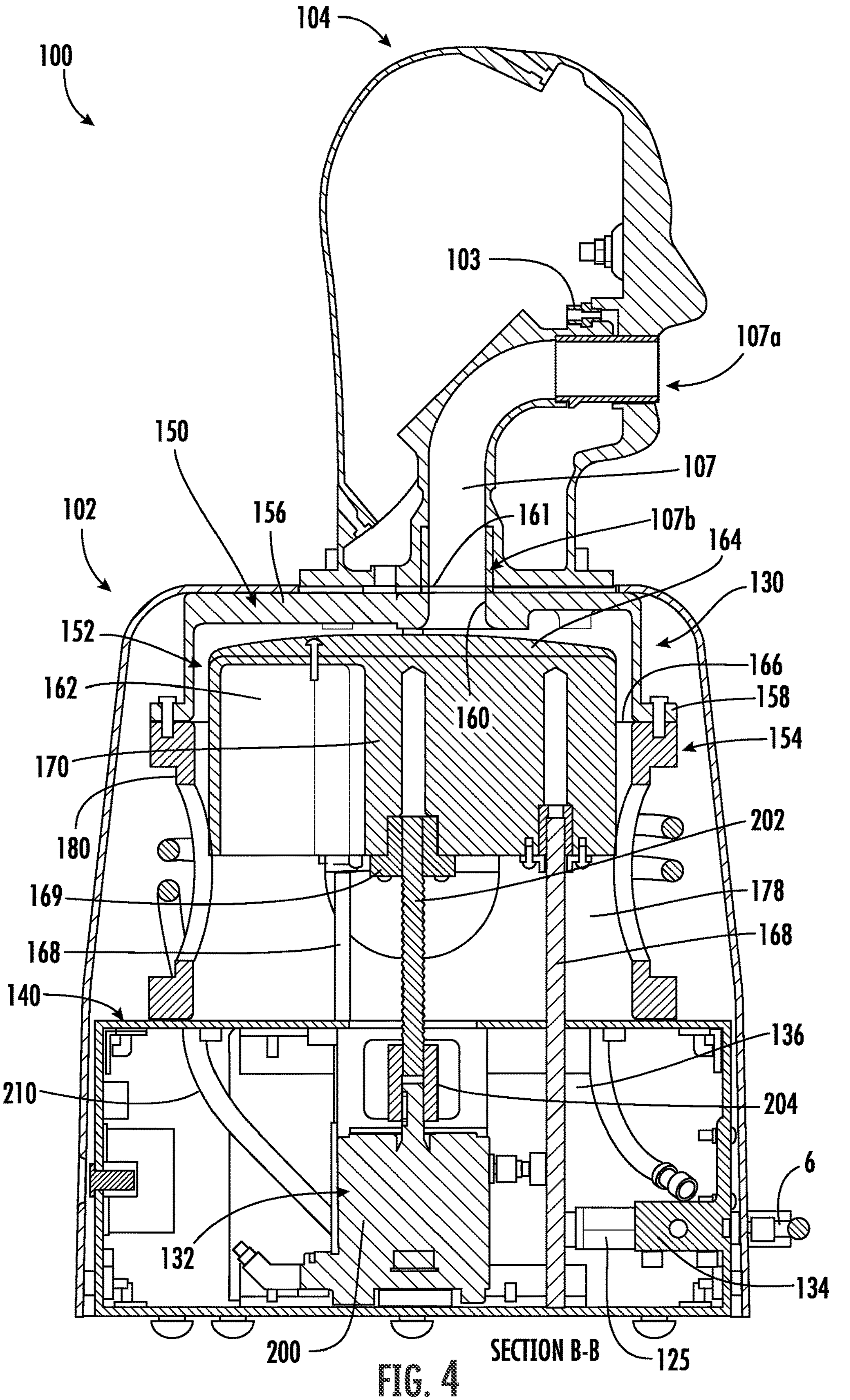
Figure 5:
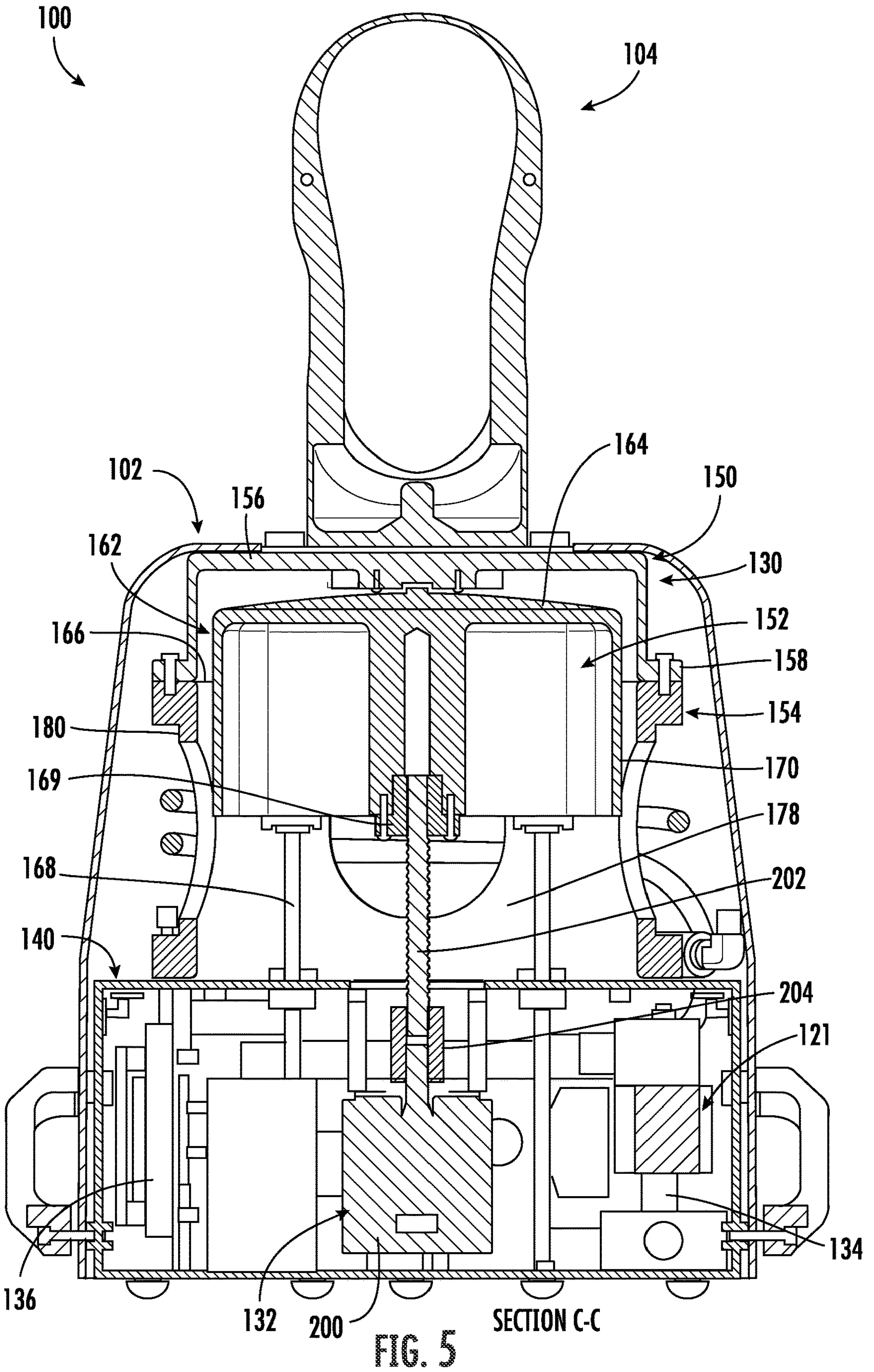
Figure 6:
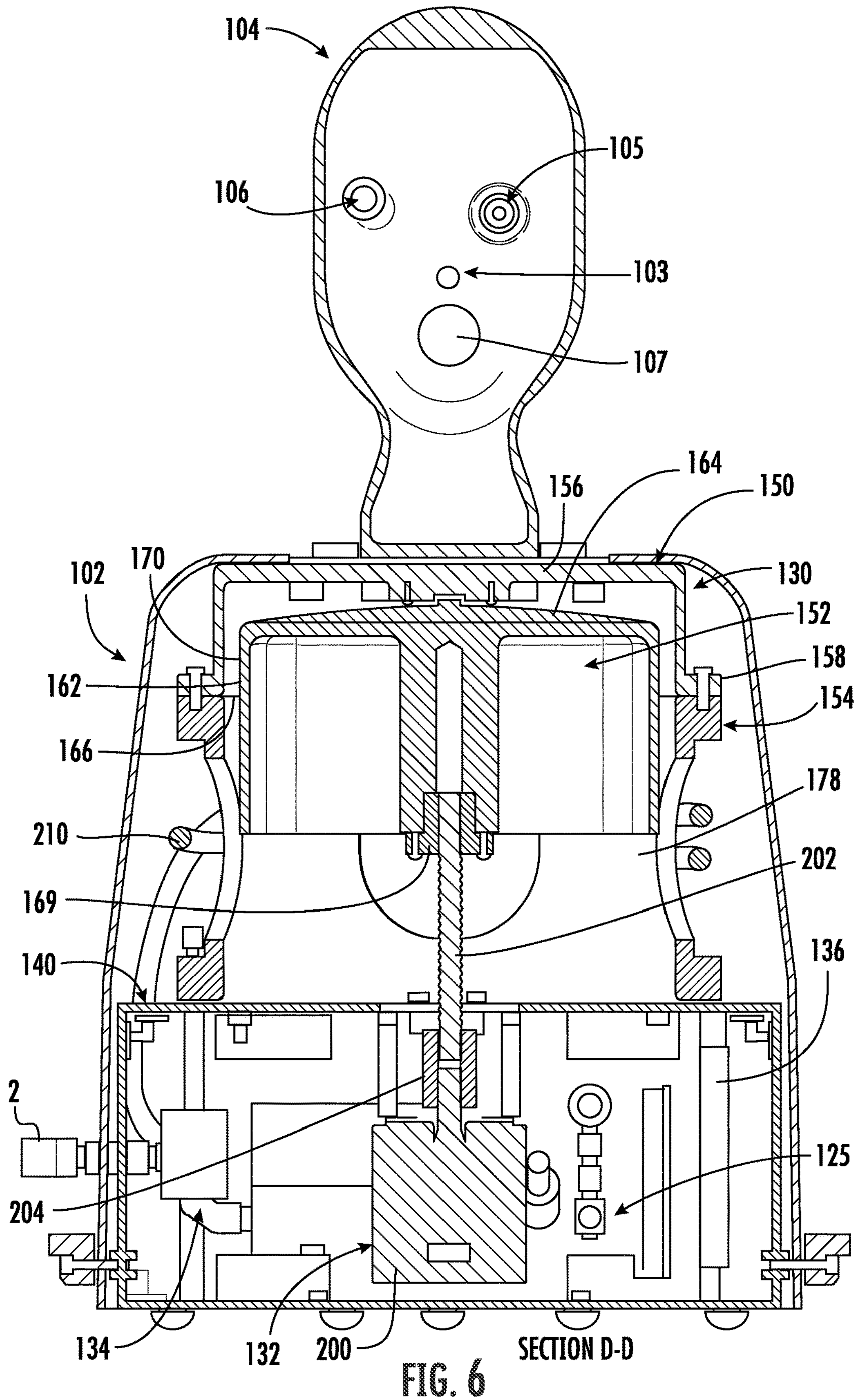
Figure 7:
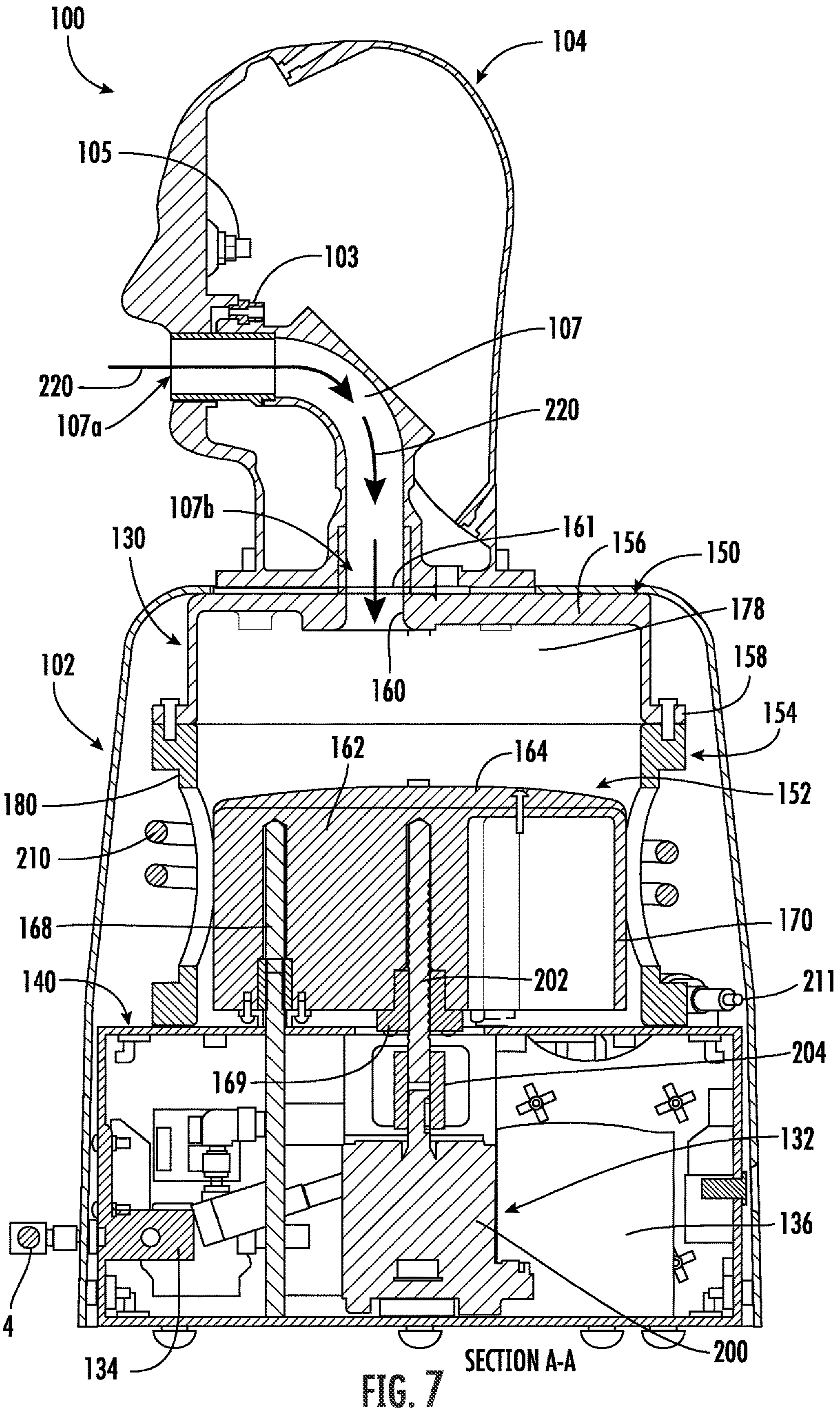
Figure 8:
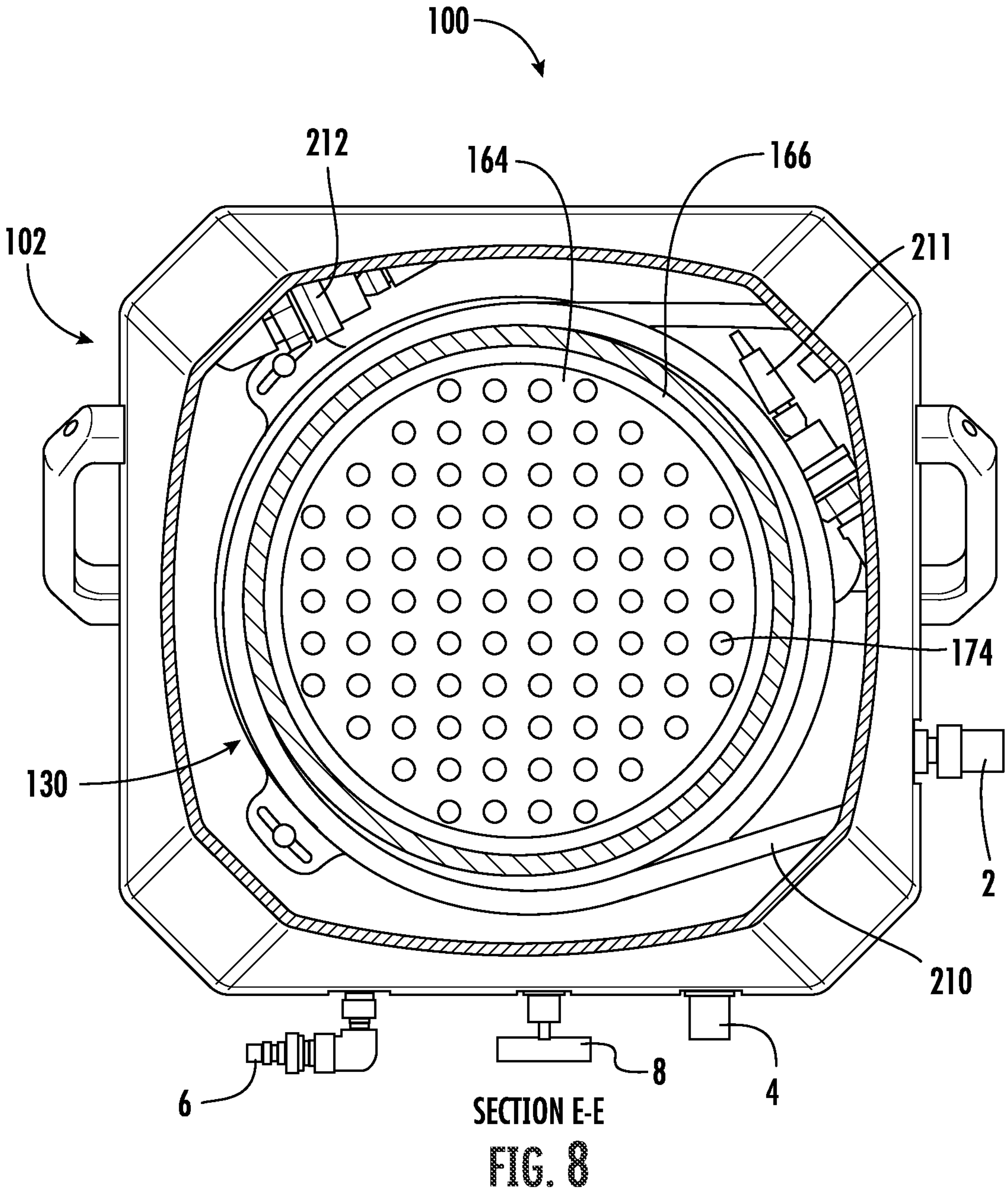
Figure 9:
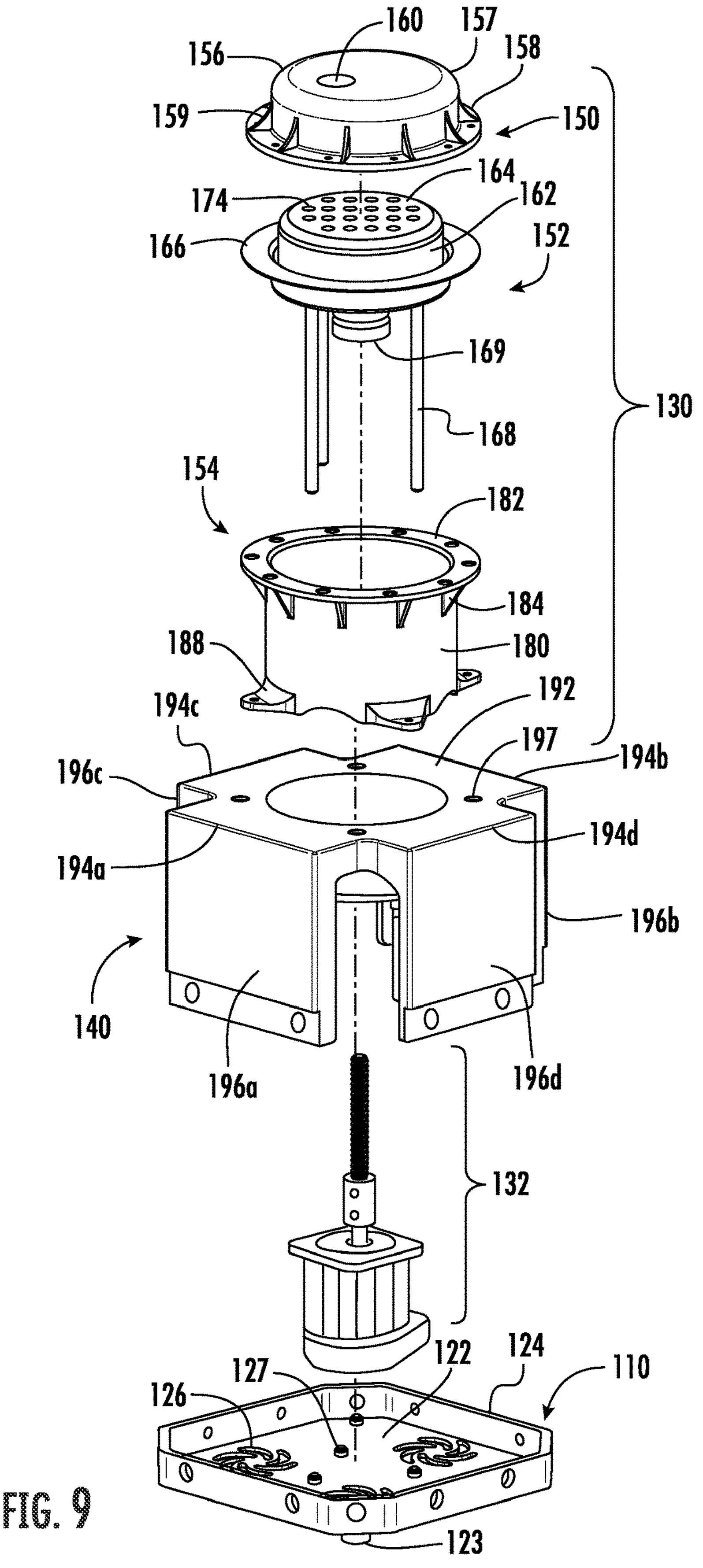
Figure 10:
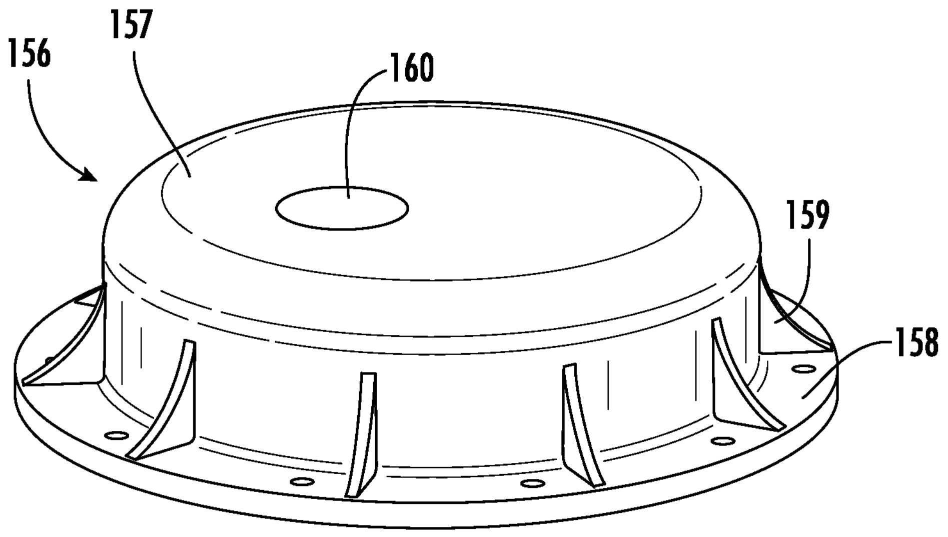
Figure 11A:
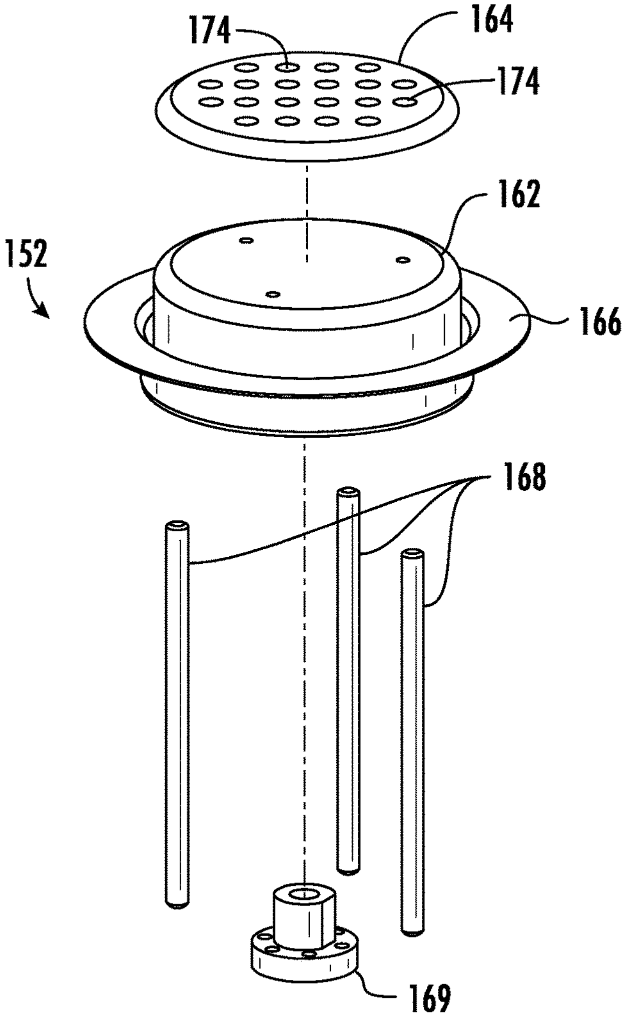
Figure 11B:
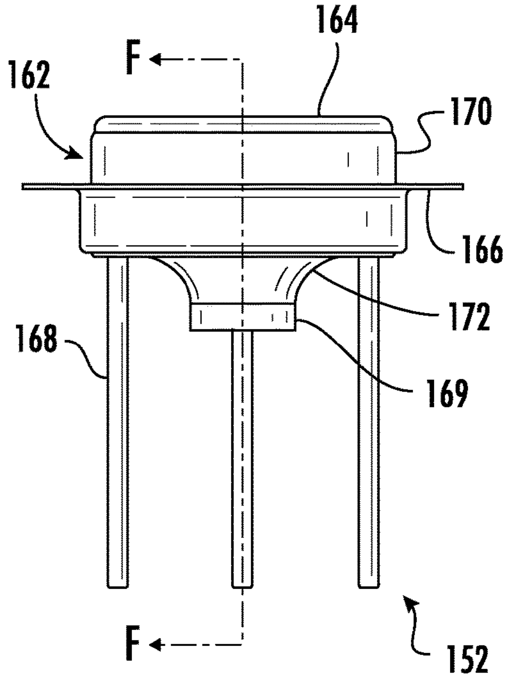
Figure 11C:
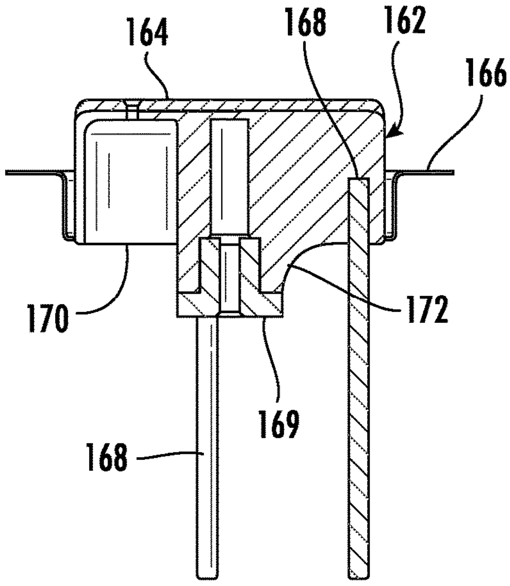
Figure 12:
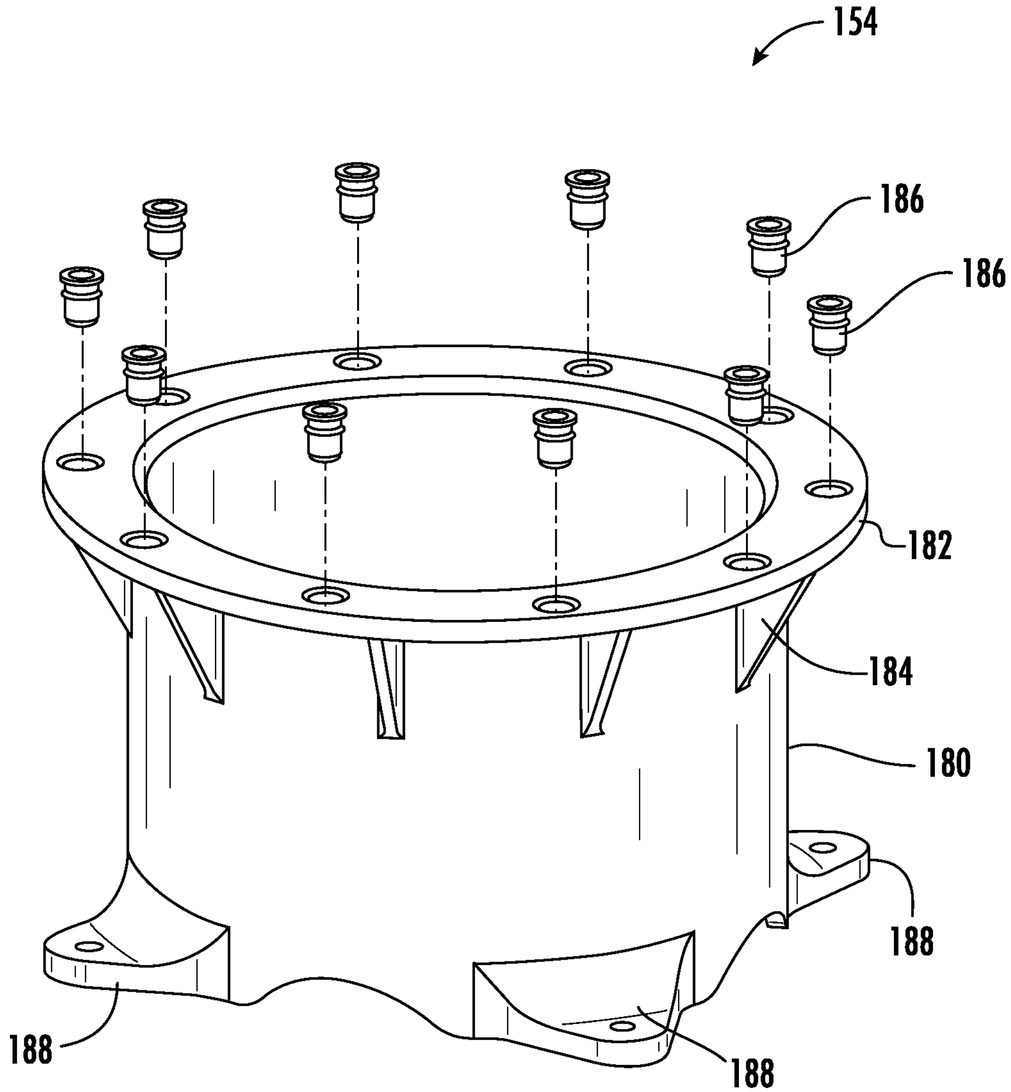
Figure 13:
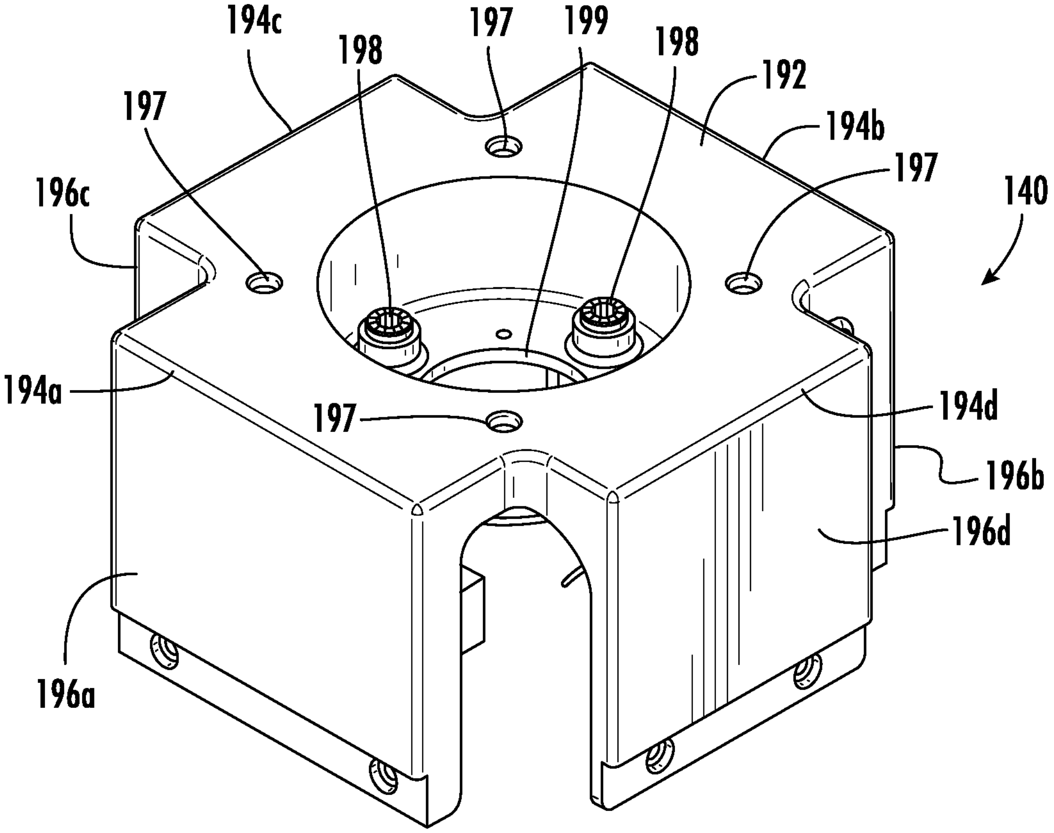
Figure 14A:
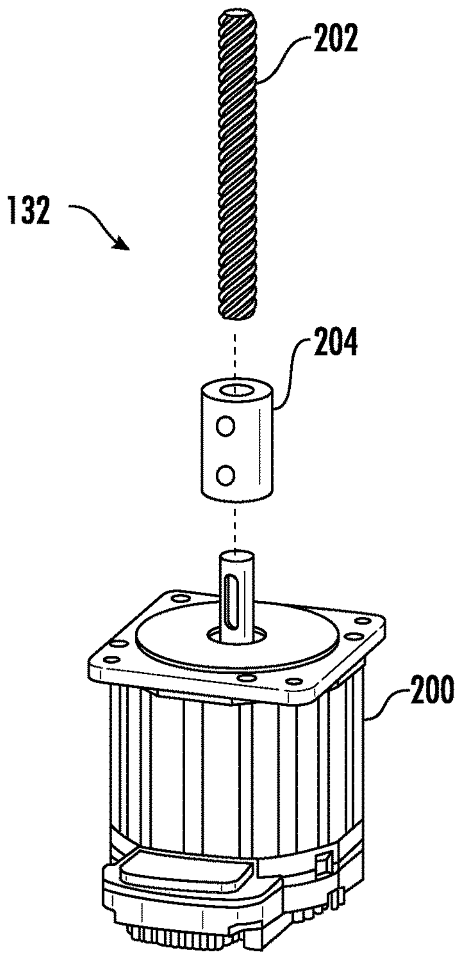
Figure 14B:
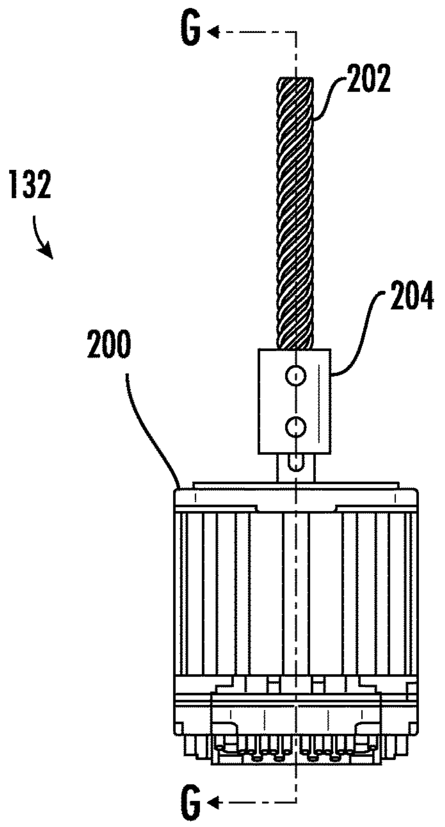
Figure 14C:
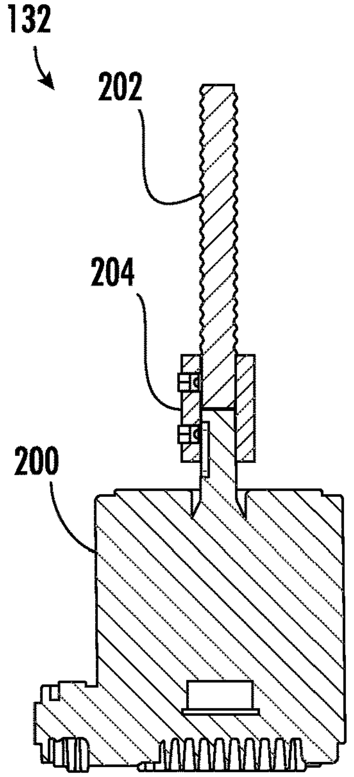

Having thus described embodiments of the present disclosure in general terms, reference will now be made to the accompanying drawings, wherein:

FIG. 1A is a front elevational view illustrating a testing apparatus for respirators according to an embodiment of the presently described subject matter;

FIG. 1B is a top plan view illustrating the testing apparatus of FIG. 1A;

FIG. 1C a right side perspective view illustrating the testing apparatus of FIGS. 1A and 1B;

FIG. 1D is a left side perspective view illustrating the testing apparatus of FIGS. 1A-1C;

FIG. 1E is a right side elevational view illustrating the testing apparatus of FIGS. 1A-1D;

FIG. 1F is a left side elevational view illustrating the testing apparatus of FIGS. 1A-1E;

FIG. 1G is a bottom plan view illustrating the testing apparatus of FIGS. 1A-1F;

FIG. 2A is an exploded top perspective view illustrating an embodiment of a baseplate assembly of the testing apparatus of FIGS. 1A-1G;

FIG. 2B is a top perspective view illustrating the baseplate assembly of FIG. 2A;

FIG. 3 is a cross-sectional view taken along section line A-A from FIG. 1A of the testing apparatus, wherein a piston of a piston assembly is in a first position;

FIG. 4 is a cross-sectional view taken along section line B-B from FIG. 1A of the testing apparatus, wherein the piston of the piston assembly is in the first position;

FIG. 5 is a cross-sectional view taken along section line C-C from FIG. 1F of the testing apparatus, wherein the piston of the piston assembly is in the first position;

FIG. 6 is a cross-sectional view taken along section line D-D from FIG. 1F of the testing apparatus, wherein the piston of the piston assembly is in the first position;

FIG. 7 is a cross-sectional view taken along section line A-A from FIG. 1A of the testing apparatus, wherein the piston of the piston assembly is in a second position;

FIG. 8 is a cross-sectional view taken along section line E-E from FIG. 1A of the testing apparatus, wherein an upper surface of the piston of the piston assembly is shown;

FIG. 9 is an exploded perspective view illustrating various subassemblies of the testing apparatus of FIGS. 1-8;

FIG. 10 is a top perspective illustrating a cylinder lid subassembly of the piston assembly shown in FIGS. 3-6;

FIG. 11A is an exploded perspective view illustrating an embodiment of the piston subassembly of the testing apparatus of FIGS. 1-7;

FIG. 11B is a side elevational view illustrating the piston subassembly of FIG. 11A;

FIG. 11C is cross-section view of the piston subassembly taken along section line F-F from FIG. 11B;

FIG. 12 is an exploded perspective view of an embodiment of the cylinder riser subassembly of the testing apparatus of FIGS. 1-7;

FIG. 13 is a top perspective view illustrating an embodiment of a support structure of the testing apparatus of FIGS. 1-7;

FIG. 14A is an exploded perspective view of an embodiment of a motor assembly of the testing apparatus of FIGS. 1-7;

FIG. 14B is a side elevational view of the motor assembly of FIG. 14A; and FIG. 14C is cross-section view of the motor assembly taken along section line G-G from FIG. 14B.

DETAILED DESCRIPTION

Embodiments of the presently described subject matter will now be described more fully hereinafter with reference to the accompanying drawings, in which some, but not all, embodiments are shown. Indeed, the presently described subject matter may be embodied in many different forms and should not be construed as limited to the embodiments set forth herein; rather, these embodiments are provided so that this disclosure will satisfy applicable legal requirements. Like numbers refer to like elements throughout.

The presently described subject matter provides a testing apparatus for respirators that can be manufactured efficiently and cost effectively. An advantage of the testing apparatus over prior art testing devices is that numerous components, assemblies, and subassemblies of the testing apparatus described herein may be formed by an additive process (e.g., three-dimensional (3D) printing). The testing apparatus, according to embodiments of the presently described subject matter, provides for operational testing of various types of respirators.

Unlike a traditional testing devices, the testing apparatus can be used to test various types of respirators, including but not limited to, air-purifying respirators (APRs), powered air-purifying respirators (PAPRs), and self-contained breathing apparatuses (SCBAs). The testing apparatus moves air into and out of the respirator thus determining whether the respirator operates satisfactorily. The testing apparatus provides a user an ability to adjust and/or select different operating settings to meet predefined testing requirements, regulations, and standards (e.g. ISO 16900) such as those set by local, state, and federal law, governmental agencies (e.g. Occupational Safety and Health Administration (OSHA), National Institute for Occupational Safety and Health (NIOSH), and/or other organizations (e.g. National Fire Protection Association (NFPA)). In a non-limiting example, the user may adjust and/or select different breathing patterns and volumes of air used by the testing apparatus for different types of respirators. Additionally, the testing apparatus may employ basic alarm functions to notify the user when the respirator being tested or the testing apparatus requires attention such as when the respirator is not properly connected to the testing apparatus, an error occurs during a test sequence, and/or when the respirator fails a test, for example.

Unlike a traditional testing devices, the testing apparatus is lightweight, portable (carried by hand), and thus is easy to transport and use in unconventional settings. Additionally, unlike a traditional testing devices, different oxygen or other gas sources may be used and easily interchanged, thus allowing the testing apparatus to be quite versatile. The testing apparatus is a positive-displacement, piston-driven testing device. The testing apparatus, in different operating modes, can use various gases such as ambient air, compressed gas, or a mixture thereof. It should be appreciated that the ambient air and compressed gas may comprise a mixture of gases and be less than 100% oxygen. For example, the ambient air may be comprised of 79% nitrogen, 21% oxygen, and a trace amount of other gases. A trace amount is defined as 0.02% of less. In certain embodiments, the compressed gas may be one of nitrox comprising nitrogen and oxygen; trimix comprising nitrogen, oxygen, and helium; heliair comprising nitrogen, oxygen, and helium, but mixed differently than trimix; heliox comprising oxygen and helium; and hydreliox comprising helium, hydrogen, and oxygen.

Referring now to FIGS. 1A, 1B, 1C, 1D, 1E, 1F, and 1G, front elevational, top plan, right side perspective, left side perspective, right side elevational, left side elevational, and bottom views, respectively, of the testing apparatus 100 are shown according to an embodiment of the present disclosure. As illustrated, the testing apparatus 100 may include a base portion 102, a receiving portion 104, and a controller 120 in electrical communication with at least one of the base portion 102 and the receiving portion 104. Although the receiving portion 104 shown has a size, shape, and configuration of a human head, it is understood that the receiving portion 104 may have any suitable size, shape, and configuration as desired for removeably coupling a respirator to be tested (not depicted) thereto. Preferably, the receiving portion 104 may be configured to receive a facepiece of the respirator thereon and to form a substantially fluid-tight seal therebetween.

The receiving portion 104 may include a first sensor 105 and a second sensor 106 disposed therein. In certain embodiments, the first sensor 105 may be a pressure sensor and the second sensor 106 may be an optical sensor. The first sensor 105 and/or the second sensor 106 may be used to detect whether the facepiece of the respirator is properly connected to the receiving portion 104 prior to initiating and/or during a test sequence. Additionally, the first sensor 105 may be used to measure a pressure within the facepiece during the testing sequence. The first sensor 105 may be connected to a transducer 211 (depicted in FIGS. 3, 7, and 8) configured to generate and transmit a signal representative of the facepiece pressure to the controller 120. In some embodiments, the second sensor 106 may be used to monitor gauges, instruments, a heads-up-display, and other components of the respirator during the test sequence to check for accuracy thereof. The second sensor 106 may also be in communication with the controller 120. A passageway 107 may be formed in the receiving portion 104 to permit a gas flow therethrough. A first opening 107*a* of the passageway 107 may be in communication with an external environment to the testing apparatus 100, and a second opening 107*b* of the passageway 107 may be in communication with the base portion 102. A third sensor 103 may be disposed in the receiving portion 104. In one embodiment, the third sensor 103 may be a pitot sensor such as a pitot ring disposed in the passageway 107, for example, for measuring a flow velocity and/or pressure within the passageway 107. The third sensor 103 may be in communication with a transducer 212 (depicted in FIG. 8) configured to generate and transmit a signal representative of the passageway flow velocity and/or pressure to the controller 120. It is understood that the sensor 103 may also be used to validate the testing apparatus 100 prior to or during a startup thereof.

The base portion 102 and the receiving portion 104 may be integrally formed as unitary structure or may be formed as separate and distinct components as illustrated in FIGS. 1-6. Various methods may be employed to mount the receiving portion 102 onto the base portion 100 such as by mechanical (e.g. fasteners 106) and non-mechanical joining methods (e.g. welding, epoxy, and the like), for example.

In certain embodiments, the base portion 102 may include an outer case 108 and a baseplate assembly 110 that together provide a housing for various components and assemblies of the testing apparatus 100, which are further described and shown in FIGS. 3-14C. The outer case 108 may include at least one aperture or slot 111 formed therein to allow portions of the components (e.g. a high-pressure gas inlet 2, a high-pressure gas outlet 4, an intermediate-pressure gas connection 6, and at least a portion of a bleed valve 8) and/or the assemblies of the testing apparatus 100 to extend outwardly therefrom and/or allow other components (e.g. the controller 120) to be connected thereto.

A conduit 210 (e.g. a coiled tube), shown in FIGS. 3-8, for receiving a predetermined volume of gas form a gas supply (not depicted) may be disposed within the housing of the base portion 102. It is understood that the gas supply may be any suitable gas supply of the gas or gas mixture described hereinabove as desired such as a high-pressure bottle tank, a SCBA bottle, and the like for example. An inlet end of the conduit 210 may be in fluid communication with the high-pressure gas inlet 2 via a high-pressure solenoid 121 (depicted in FIG. 5). An outlet end of the conduit 210 may be in fluid communication with the high-pressure gas outlet 4 via a manifold block 134 (depicted in FIGS. 3-7). A fourth sensor/transducer (not depicted) may be disposed in one of the conduit 210, the solenoid 121, and the manifold block 134 to measure a pressure within the conduit 210. The sensor/transducer may configured to generate and transmit a signal representative of the conduit pressure to the controller 120. A bleed valve 8 may also be in fluid communication with the manifold block 134 to permit a user of the testing apparatus 100 to release a pressure within the conduit 210 when operation of the testing apparatus 100 is ceased. When the testing apparatus 100 is in operation, the bleed valve 8 may be configured to remain closed.

Additional pneumatic and electrical components for operation of the testing apparatus 100 may be disposed within the housing of the base portion 102 such as a pressure sensor/transducer 125 shown in FIG. 6 into which the intermediate-pressure gas connection 6 may be deadheaded, a data acquisition module 136, electrical wiring and connectors, and the like, for example. The sensor/transducer 125 may be configured to measure a pressure of a regulator low-pressure outlet of the respirator and generate and transmit a signal representative of the regulator pressure to the controller 120.

The base portion 102 may further include an on-off switch (not depicted), a data port (not depicted), a power port (not depicted), and an information screen (not depicted). At least one handle 112 may be provided on the base portion 102 for transporting, positioning, and/or securing the testing apparatus 100. As shown, a pair of handles 112 may be disposed on opposite sides of the outer case 108. It is understood, however, that the handle or handles 112 may be located elsewhere if desired.

FIGS. 2A and 2B, respectively, show an exploded view and a perspective view of the baseplate assembly 110. The baseplate assembly 110 includes a generally planar plate 122 having an upturned rim portion 124 formed along an entire outer peripheral edge of the plate 122 and rubber feet 123. At least one aperture 126 may be formed in the plate 122 to allow for air circulation within the base portion 102 and around the components and assemblies disposed therein for cooling thereof. Fasteners 127 such as rivet nuts, for example, may be inserted into the baseplate assembly 100 and used to connect the baseplate assembly 110 to the outer case 108 and/or the rubber feet 123 to the baseplate assembly 110.

As best seen in FIGS. 3-8, the testing apparatus 100 further includes a piston assembly 130 and a motor assembly 132 disposed within the housing provided in the base portion 102. A support structure 140 may be disposed in the base portion 102 between the piston assembly 130 and the motor assembly 132. The support structure 140 may provide separation between pneumatic components and electrical components of the testing apparatus 100. The support structure 140 may be coupled to at least one of the outer case 108 and the baseplate assembly 110 to maintain a position within the base portion 102. Various methods may be employed to secure the support structure 140 to the base portion 102 such as by mechanical and non-mechanical methods, for example.

FIG. 9 is an expanded view of the piston assembly 130, the motor assembly 132, the support structure 140, and the baseplate assembly 110 of the testing apparatus 100 with the piston assembly 130 further expanded into subassemblies thereof. In the embodiment illustrated in FIG. 9, the piston assembly 130 may comprise a cylinder lid subassembly 150, a piston subassembly 152, and a cylinder riser subassembly 154. The cylinder lid subassembly 150 may be joined together with the cylinder riser subassembly 154 to form a chamber 178 therein.

FIG. 10 shows a perspective view of the cylinder lid subassembly 150. The cylinder lid subassembly 150 includes a cylinder lid 156 having a generally disc-shaped main portion 157 with a radially outwardly extending flange portion 158. At least one support rib 159 may extend between an outer circumferential surface of the main portion 157 and an upper surface of the flange portion 158. An aperture 160 may be formed in an upper surface of the main portion 157 of the cylinder lid 156. As more clearly shown in FIGS. 3 and 7, the aperture 160 may be formed to align with an aperture 161 formed in the outer case 108 of the base portion 102 and the second opening 107*b* of the passageway 107 to permit a gas flow from the chamber 178, through the passageway 107, and out of the first opening 107*a* during a simulated exhalation of the testing apparatus 100 demonstrated by arrows 220 in FIG. 3, and vice versa during a simulated inhalation of the testing apparatus 100 demonstrated by arrows 220 in FIG. 7. An amount of gas in the chamber 178 decreases during the simulated exhalation of the testing apparatus 100 and increases during the simulated inhalation thereof.

At least one inhalation check valve (not depicted) may be disposed between the external environment and the chamber, the at least one inhalation check valve configured to allow the gas flow from the external environment to the chamber 178 during the simulated inhalation and not to allow the gas flow from the chamber 178 to the external environment during the simulated inhalation; and at least one exhalation check valve (not depicted) may be disposed between the chamber 178 and the external environment, the at least one exhalation check valve configured to allow the gas flow from the chamber 178 to the external environment during the simulated exhalation and not to allow the gas flow from the external environment to the chamber 178 during the simulated exhalation.

FIGS. 11A, 11B, and 11C, respectively, show a partially exploded view, a side elevational view, and a cross-section of the piston subassembly 152. The piston subassembly 152 according to an embodiment of the presently disclosed subject matter includes a piston 162, a piston top 164, a sealing element 166, at least one guide post 168, and a lead screw nut 169. Although three guide posts 168 are used in the embodiment shown, any number of guide posts 168 may be employed.

As illustrated, the piston 162 includes a main portion 170 having a generally cylindrical shape with a generally frustoconical-shaped portion 172 extending downwardly therefrom. An upper surface of the piston 162 may be configured to receive the piston top 164 thereon. In certain embodiments, an upper surface of the piston top 164 may include at least one surface irregularity 174 formed therein or thereon to minimize an impact of pressure waves on the piston assembly 130 and surrounding components of the testing apparatus 100. As best seen in FIG. 11A, the upper surface of the piston top 164 includes a plurality of dimples or indentations 174 formed therein. It should be appreciated that the at least one surface irregularity 174 may be formed in an upper surface of the piston 162 in embodiments of the piston subassembly 152 that do not include the piston top 164. It is understood, however, that any suitable surface irregularity may be employed such as protuberances, ribs, channels, and the like, for example. It is further understood that the upper surface the piston top 164 or piston 162 may include any number, shape, size, and configuration of surface irregularities as desired to minimize the impact of the pressure waves on the testing apparatus 100. It is also understood that not all of the surface irregularities 174 formed in the piston top 164 or piston 162 are substantially similar or identical.

Referring back to FIGS. 3-7, the piston subassembly 152 shown may be disposed in the chamber 178 formed by the cylinder lid subassembly 150 and the cylinder riser subassembly 154. The sealing element 166 may be disposed between an outer circumferential surface of the piston 162 and an inner circumferential surface of the chamber 178 to form a substantially fluid-tight seal therebetween as the piston 162 moves from a first position, shown in FIGS. 3-6, to a second position, shown in FIG. 7, for a simulated exhalation of the testing apparatus 100, and as the piston 162 moves from the second position to the first position for a simulated inhalation of the testing apparatus 100. In a preferred embodiment, the sealing element 166 may be a rolling seal. Use of the rolling seal as the sealing element 166 for the piston subassembly 152 provides abrasion resistance and allows the piston 162 to be formed by an additive process (e.g. three-dimensional (3D) printing). As a non-limiting example, the rolling seal may comprise a polyvinyl chloride material having a shore hardness of 30 durometers disposed over a cloth core. In one embodiment, the conduit 210 may be coiled about the piston subassembly 152.

FIG. 12 shows the cylinder riser subassembly 154 in accordance with an embodiment of the presently described subject matter. The cylinder riser subassembly 154 may include a hollow cylinder 180 having a radially outwardly extending upper flange portion 182. At least one support rib 184 may extend between an outer circumferential surface of the cylinder 180 and a lower surface of the flange portion 182. The flange portion 182 may be configured to align and cooperate with the flange portion 158 of the cylinder lid subassembly 150. Fasteners 186 (e.g. rivet nuts) may be employed to releaseably couple the cylinder riser subassembly 154 to the cylinder lid subassembly 150. As illustrated, the cylinder 180 may further include a plurality of radially outwardly extending lower flange portions 188 to releaseably couple the cylinder riser subassembly 154 to the support structure 140.

FIG. 13 shows an embodiment of the support structure 140. The support structure 140 may include a main body 192 having a generally "plus" shape formed by four sides 194*a*, 194*b*, 194*c*, 194*d* with respective leg portions 196*a*, 196*b*, 196*c*, 196*d* extending downwardly therefrom. Each of the leg portions 196*a*, 196*b*, 196*c*, 196*d* may be configured to be coupled to the baseplate assembly 110. An upper surface of the main body 192 may include at least one aperture 197 formed therein for receiving a fastener (not depicted) to the piston assembly 130, and more particularly the flange portions 188 of the cylinder riser subassembly 154 thereto. At least one guide hole 198 may be formed in the support structure 140 to receive a portion of the piston assembly 130 therethrough. The support structure 140 may further include a center bore 199 formed therein to receive a portion of the motor assembly 132 therethrough. In the embodiment shown, a plurality of guide holes 198 may be arranged in an annular array around an outer circumference of the center bore 199. It is understood that the support structure 140 may include other features not shown or described herein for assembly and operation of the testing apparatus 100. It is further understood that the support structure 140 may have any suitable size, shape, and configuration as desired for assembly and operation of the testing apparatus 100.

Referring now to FIGS. 14A, 14B, and 14C, respectively, illustrating the motor assembly 132 in exploded, side elevational, and cross section. In the embodiment shown, the motor assembly 132 may include a motor 200 connected to a lead screw 202 by a shaft coupling 204. As shown in FIGS. 3-7, the lead screw 202 operably connects the motor 200 to the piston 162 of the piston assembly 130. The lead screw 202 may be secured to the piston 162 by the lead screw nut 169 of the piston subassembly 152. The guide posts 168 are configured to maintain a substantially horizontal position of the piston 162 as well as guide a movement thereof during the simulated exhalation and simulated inhalation of the testing apparatus 100.

The motor 200 may be configured to provide an exhalation force, via the lead screw 202, during the simulated exhalation to move the piston 162 in an exhalation direction from the second position within the chamber 178 to the first position, thereby causing gas within the chamber 178 to flow out from the chamber 178, through the apertures 160, 161, into the second opening 107*b* and through the passageway 107 past the third sensor 103, and out from the first opening 107*a* of the passageway 107 into the external environment. Similarly, the motor 200 may be configured to provide an inhalation force, via the lead screw 202, during the simulated inhalation to move the piston 162 in an inhalation direction from the first position within the chamber 178 to the second position, thereby causing gas from the external environment to be drawn into the first opening 107*a* and through the passageway 107 past the third sensor 103, out from the second opening 107*b* of the passageway 107, through the apertures 161, 160, and into the chamber 178. The third sensor 102 may sense a velocity and/or a pressure of the gas flow from the chamber 178 to the external environment during the simulated exhalation and from the external environment to the chamber 178 during the simulated inhalation.

When testing of an OC-SCBA type respirator is desired, a facepiece of the respirator may be disposed on the receiving portion 104 of the testing apparatus 100. Thereafter, the gas supply may be connected to the high-pressure inlet 2 of the testing apparatus 100 and the high-pressure outlet 4 of the testing apparatus 100 may be connected to a high-pressure inlet on the respirator. A low-pressure outlet of the respirator may be connected to the intermediate pressure connection 6 of the testing apparatus 100. Additionally, the regulator of the respirator may be connected to the facepiece disposed on the receiving portion 104 of the testing apparatus 100. Once all of the connections are complete, the testing apparatus 100 may be activated to commence a testing sequence. During the testing sequence, the piston 162 may operate as discussed elsewhere herein to cause the chamber 178 to increase in volume during the simulated inhalation and decrease in volume during the simulated exhalation. The sensors 103, 105, with the associated transducers 211, 212 along with the sensor/transducer 125 may be used to sense various pressures of the testing apparatus 100 and generate signals associated therewith. The transducers 125, 211, 212 may then transmit the signals to the controller 120, via the data acquisition module 136, for analysis during the testing sequence of the testing apparatus 100. It should be appreciated that the solenoid 121 may be selectively enabled to inject the predetermined volume of gas at a desired rate into the testing apparatus 100 for certain steps of the testing sequence. Upon completion of the testing sequence, subsequent testing sequences may be conducted or the testing apparatus 100 deactivated and operation thereof ceased.

When testing of non-OC-SCBA type respirators (e.g. particulate filter, PAPR, CBRN, and CC-SCBA type respirators) is desired, a facepiece of the respirator may be disposed on the receiving portion 104 of the testing apparatus 100. Thereafter, the testing apparatus 100 may be activated to commence a testing sequence. During the testing sequence, the piston 162 may operate as discussed elsewhere herein to cause the chamber 178 to increase in volume during the simulated inhalation and decrease in volume during the simulated exhalation. The sensor 103 with associated transducer 211 may be used to sense an inhalation pressure and an exhalation pressure and generate signals associated therewith. The transducer 211 may then transmit the signals to the controller 120, via the data acquisition module 136, for analysis during the testing sequence of the testing apparatus 100. Upon completion of the testing sequence, subsequent testing sequences may be conducted or the testing apparatus 100 deactivated and operation thereof ceased.

A startup method, a first method for OC-SCBA type respirator testing, and a second method for particulate filter, PAPR, CBRN, and CC-SCBA type respirator testing is described herein. It is understood that the testing apparatus 100 may configured to conduct more or less methods for respirator testing than described.

In certain embodiments, the startup method may be conducted prior to both the first method and the second method. The startup method begins by powering on the testing apparatus 100. A user then logs into the testing apparatus 100. The testing apparatus 100 determines if the facepiece is properly connected to the receiving portion 104 of the testing apparatus 100. If not properly connected, the user and/or the testing apparatus 100 conducts a leak test and troubleshoots a cause for the improper connection of the facepiece. Once the improper connection of the facepiece has been addressed, the startup method may be continued. It is understood that previous steps may be repeated until the facepiece is properly connected to the testing apparatus 100. Once the facepiece has been properly connected, the testing apparatus 100 proceeds to unit selection. Information such as respirator type, for example, may be entered and equipment may be visually assessed. Thereafter, the testing apparatus 100 may be ready to begin testing.

When the respirator is an OC-SCBA type, the first testing method may be selected. A main sequence testing may be initiated. During the main sequence testing, an initial second stage cracking (or inhalation) effort may be measured and a facepiece exhalation valve opening pressure may be measured. A maximum facepiece pressure during breathing resistance test may be conducted at a predetermined level (i.e. 85 L/min+/−1 L/min). A minimum facepiece pressure during breathing resistance test may be conducted at a predetermined level (i.e. 40 L/min+/−1 L/min). A facepiece pressure during breathing resistance test may be conducted at a predetermined level (i.e. 103 L/min+/−3 L/min). A first stage pressure during breathing resistance test may be conducted at a predetermined level (i.e. 103 L/min+/−3 L/min). A first stage pressure during breathing resistance test may be conducted at a predetermined level (i.e. 40 L/min+/−1 L/min). It is understood that the predetermined levels may be any desired values as desired. In certain embodiments, however, the predetermined levels are set by the predefined testing requirements, regulations, and standards (e.g. ISO 16900) such as those set by local, state, and federal law, governmental agencies (e.g. Occupational Safety and Health Administration (OSHA), National Institute for Occupational Safety and Health (NIOSH), and/or other organizations (e.g. National Fire Protection Association (NFPA)). In one embodiment, the first testing method may use the sensor 103 with associated transducer 211 and/or the sensor 105 with associated transducer 212 to measure the initial second stage cracking and pressures. In another embodiment, the first testing method may use the sensor 103 with the associated transducer 211 to measure the initial second stage cracking and the sensor 105 with the associated transducer 212 to measure the pressures. In another embodiment, the first testing method may only use the sensor 103 with the associated transducer 211 to measure the initial second stage cracking and the pressures.

A remote pressure gauge accuracy at pressure range may be determined. An end of service time indicator activation pressure may be measured.

Once the main sequence testing is completed, a static testing may be initiated. A facepiece static pressure may be measured and a first stage regulator (pressure reducer) static pressure may be measured.

Once the static testing is completed, a bypass valve testing may be initiated. A bypass valve flow may be measured. In certain embodiments, the high-pressure solenoid 121 may be opened and the predetermined volume of gas from the gas supply may be permitted to flow into the conduit 210. The high-pressure solenoid 121 may be then closed and a bypass may be opened permitting a free flow of the gas from the conduit 210 through the regulator of the respirator. The gas flows from the conduit 210 through the regulator until the predetermined volume of gas is exhausted and the conduit 210 is substantially empty. The controller 120 measures a time elapsed to empty the predetermined volume of gas from the conduit 210, and then calculates a flow rate (e.g. L/min). The flow rate may be compared with predefined testing requirements, regulations, and standards (e.g. ISO 16900) such as those set by local, state, and federal law, governmental agencies (e.g. Occupational Safety and Health Administration (OSHA), National Institute for Occupational Safety and Health (NIOSH), and/or other organizations (e.g. National Fire Protection Association (NFPA)).

Thereafter, an acceptability evaluation may be conducted. If not acceptable, the first testing method including the main sequence testing, the static testing, and the bypass valve testing may be repeated. On the contrary, when acceptable, a review of data may be conducted.

When the respirator is one of a particulate filter, PAPR, CBRN, and CC-SCBA type, the second testing method may be selected. A work of breathing and peak pressures testing may be initiated. If the respirator is powered, a unit blower may be turned "ON". A breathing at a user-selected respiratory minute volume may be initiated. Data may be captured to be analyzed. Therefore, an acceptability evaluation may be conducted. If not acceptable, further data may be captured to be analyzed. If acceptable, a review of the data may be conducted.

It is understood that each of the startup method, the first method, and the second testing method, may include more or less steps as described to meet the predefined testing requirements, regulations, and standards (e.g. ISO 16900) such as those set by local, state, and federal law, governmental agencies (e.g. Occupational Safety and Health Administration (OSHA), National Institute for Occupational Safety and Health (NIOSH), and/or other organizations (e.g. National Fire Protection Association (NFPA)).

Embodiments of the presently described subject matter described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for testing respirators and implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the present disclosure. Therefore, it is to be understood that, within the scope of the appended claims, the present disclosure may be practiced other than as specifically described herein.

What is claimed is:

1. A testing apparatus for a respirator, comprising:

a base portion;

a receiving portion configured to receive a facepiece of the respirator;

a passageway formed in the receiving portion to permit a gas flow therethrough, the passageway having a first opening in communication with an external environment, and a second opening in communication with the base portion;

a piston assembly located in the base portion and configured to produce a simulated exhalation and a simulated inhalation, the piston assembly in fluid communication with the passageway;

a first sensor disposed in the receiving portion separate from the first opening of the passageway, the first sensor configured to detect a pressure within the facepiece of the respirator; and at least one additional sensor configured to detect a pressure within the passageway during at least one of the simulated inhalation and the simulated exhalation, wherein the testing apparatus is configured to determine whether the respirator meets at least one predefined requirement based upon input from at least one of the first sensor and the at least one additional sensor.

2. The testing apparatus of claim 1, wherein the at least one additional sensor is a pressure sensor.

3. The testing apparatus of claim 1, wherein the at least one additional sensor is an optical sensor.

4. The testing apparatus of claim 1, wherein the at least one additional sensor is an optical sensor configured to monitor at least one component of the respirator.

5. The testing apparatus of claim 1, wherein the at least one additional sensor is a pitot sensor disposed in the passageway of the receiving portion of the testing apparatus.

6. The testing apparatus of claim 1, wherein at least a part of the piston assembly is formed from an additive process.

7. The testing apparatus of claim 1, wherein an upper surface of the piston assembly includes at least one surface irregularity to minimize an impact of pressure waves on the piston assembly.

8. The testing apparatus of claim 1, wherein the piston assembly includes at least one sealing element to form a substantially fluid-tight seal between a piston and an inner surface of the piston assembly that defines a chamber therein.

9. The testing apparatus of claim 1, further comprising a controller in communication with the first sensor and the at least one additional sensor.

10. The testing apparatus of claim 1, wherein the receiving portion has a configuration of a human head.

11. A method for testing a respirator, the method comprising:

providing a testing apparatus configured to produce a simulated inhalation and a simulated exhalation, the testing apparatus including:

a base portion;

a receiving portion configured to receive a facepiece of the respirator;

a passageway formed in the receiving portion to permit a gas flow therethrough, the passageway having a first opening in communication with an external environment, and a second opening in communication with the base portion;

a piston assembly located in the base portion and configured to produce a simulated exhalation and a simulated inhalation, the piston assembly in fluid communication with the passageway;

a first sensor disposed in the receiving portion separate from the first opening of the passageway, the first sensor configured to detect a pressure within the facepiece of the respirator;

at least one additional sensor, the at least one additional sensor configured to detect at least one parameter;

causing, via the testing apparatus, the simulated inhalation and the simulated exhalation;

detecting, via the at least one additional sensor, a pressure within the passageway during the at least one of the simulated inhalation and the simulated exhalation; and determining, via the testing apparatus, whether the respirator meets at least one predefined requirement based upon the at least one parameter.

* * * * *